United States Patent Office 3,460,915
Patented Aug. 12, 1969

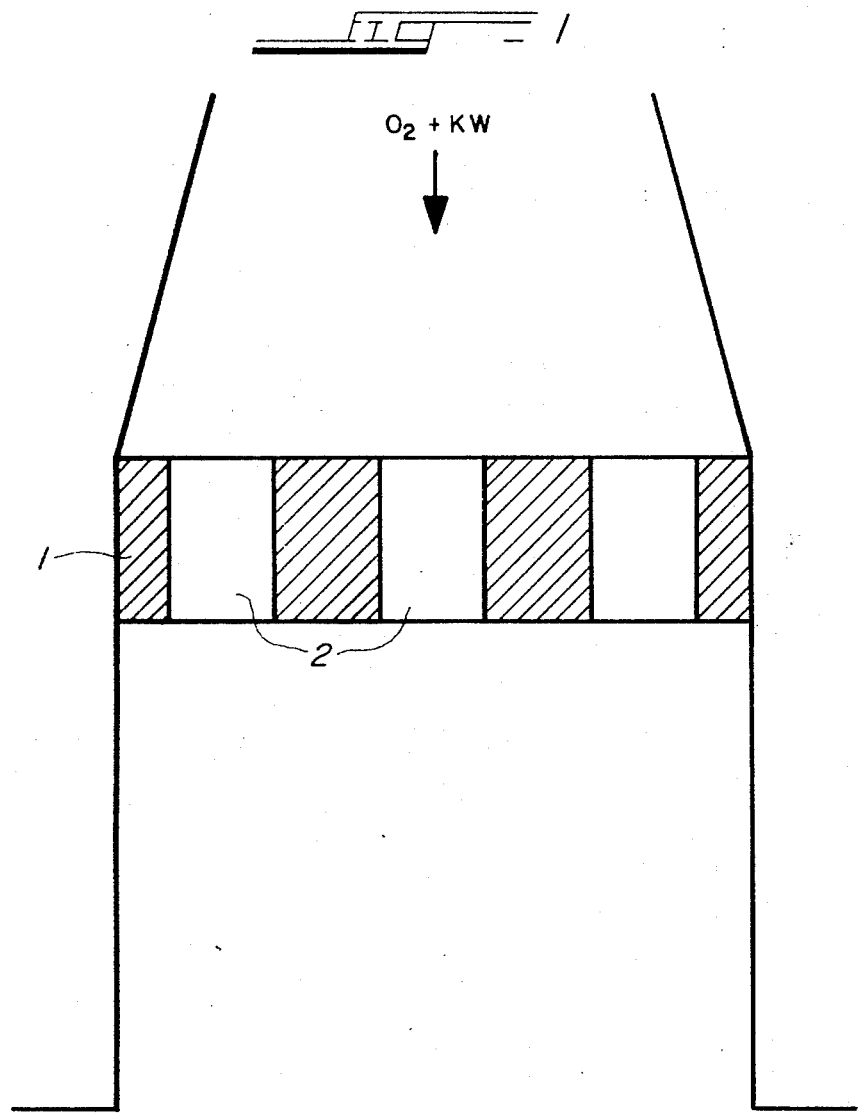

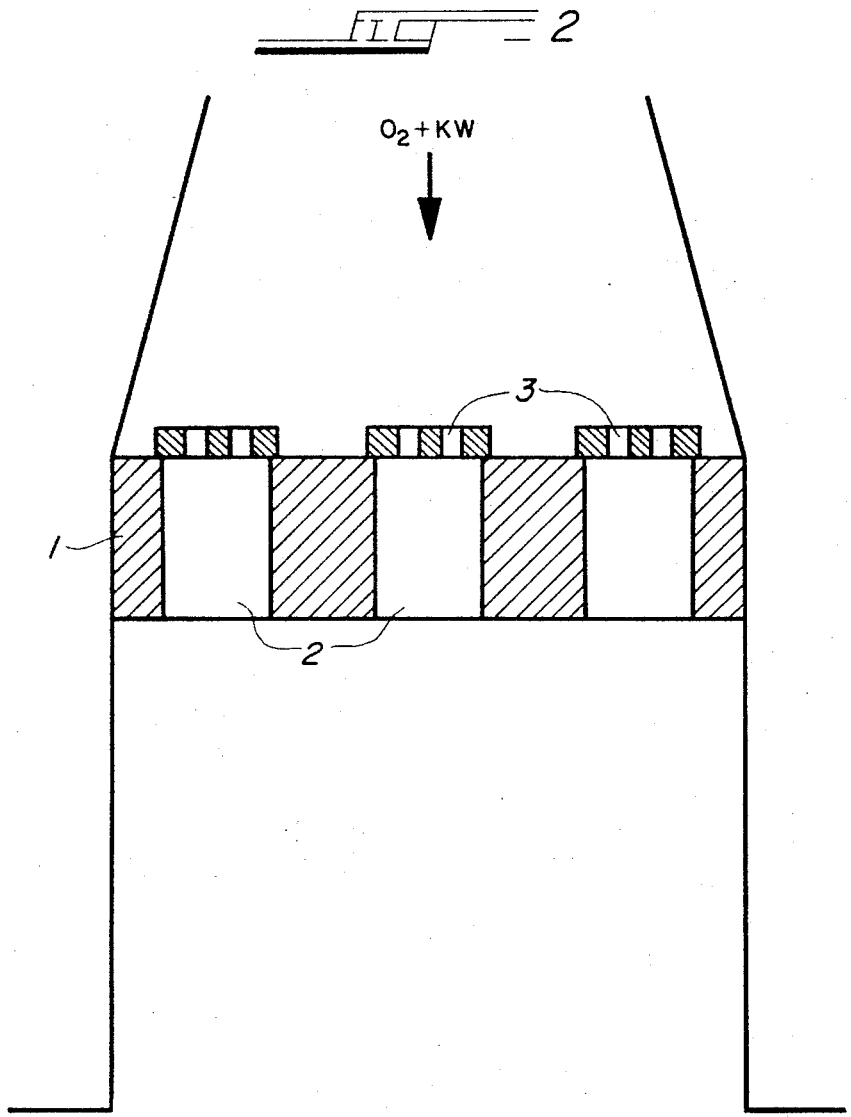

3,460,915
APPARATUS FOR THE PRODUCTION OF GASES CONTAINING ACETYLENE
Erwin Lehrer, Bad Durkheim, and Walter Teltschik, Frankenthal, Pfalz, Germany, assignors to Badische Anilin- & Soda-Fabrik Aktiengesellschaft, Ludwigshafen (Rhine), Germany
Filed July 15, 1966, Ser. No. 565,563
Claims priority, application Germany, July 30, 1965, B 83,046
Int. Cl. C07c *11/24;* B01f *5/06*
U.S. Cl. 23—277     5 Claims

ABSTRACT OF THE DISCLOSURE

Apparatus for producing acetylene by partial oxidation of hydrocarbons with oxygen with means to separately preheat the hydrocarbon and oxygen, means to mix the reactants and to conduct them through a diffusor chamber and a gas distributor containing parallel channels into a reaction chamber, the apparatus being provided with at least one perforated plate mounted on the diffusor side of the gas distributor to provide a plurality of holes in fluid communication with and constricting the free cross-sectional area of each of the channels on the diffusor side.

---

The present invention relates to an apparatus for the production of gases containing acetylene. It relates particularly to an apparatus for the production of acetylene by partial combustion of hydrocarbons with oxygen.

It is an object of this invention to provide a burner block by which preignition of the gas mixture containing oxygen is precluded.

Another object of the invention is to provide a burner block by means of which the yield of acetylene is increased.

It is known that acetylene can be prepared by partial oxidation of hydrocarbons with oxygen. Oxygen and the hydrocarbon are heated up to about 150° to 700° C. in separate preheaters and mixed in a mixer, for example in a rotation-symmetrical injector mixer, at great speed. The hot gas mixture flows through an outwardly tapering tube (diffusor) and passes through a gas distributor into the reaction chamber where cracked gas containing acetylene is produced in a flame reaction. A temperature of 1,300° to 1,650° C. is set up in the flame reaction. The flame reaction itself takes place in a period of about two-thousandths to five-thousandths of a second. At the end of the reaction chamber, the hot flame gases are quenched to about 200° C. with a cooling liquid.

It is also known that the gas distributor (see FIGURE 1 of the accompanying drawings) as previously used by us may be designed as a block 1 having a plurality of parallel channels 2. In these channels the speed of the gas mixture flowing in from the diffusor tube is increased to such an extent that it is impossible for the reaction flame to flash back through the channels into the mixer.

The more effective the quenching, the higher the yield of acetylene. It is therefore necessary to introduce as much liquid as possible in a relatively short zone behind the reaction chamber. The liquid has to be distributed very homogeneously and symmetrically to avoid disturbances in the reaction chamber which would result in a decrease in the yield. This is not always possible in practice so that disturbances do occur. These disturbances in the reaction chamber are propagated through the channels in the gas distributor into the mixer and here lead to preignition of the gas mixture, which interrupts operation and damages the mixer. The channels may contain baffles which offer resistance to the gas mixture flowing therethrough. This does not however give a satisfactory result.

We have found that the said disadvantages can be obviated (see FIGURE 2 of the accompanying drawings) by providing, on the gas distributor, perforated plates 3 which constrict the free cross-section of every channel on the diffusor side. The sum of the free cross-sectional areas of the holes in the perforated plates should advantageously be 30 to 90%, preferably 40 to 60%, of the free cross-sectional area of the channels. The perforated plates may have one or more than one hole. When it has a plurality of holes, they are preferably distributed uniformly over the perforated plate. The free cross-sectional area is the area available for the passage of gas. The thickness of the perforated plates should be only a few percent of the length of the channels, for example 0.5 to 10%, preferably 1 to 5%. One or more perforated plates may be used; for example all the channels may be partly obturated by a single perforated plate having the same size as the gas distributor or a perforated plate may be provided for each channel. The perforated plates are preferably made of metal, but they may also be made of other materials, for example ceramic materials. Propagation of any disturbances from the reaction chamber into the mixer is completely excluded by the apparatus according to this invention. Preignition is therefore no longer possible.

The invention will now be illustrated by the following example.

EXAMPLE 5,000 kg. per hour of light naphtha vapor at 300° C. and 3,300 cubic meters (STP) per hour of oxygen at 300° C. are mixed in a rotation-symmetrical injector mixer at great speed. The gas mixture flows through a cylindrical collecting tube into a diffusor and then through the channels of a gas distributor into the reaction chamber. At the entry into the channels, perforated plates are provided each of which covers about 53% of the cross-section of the channel. The thickness of the plate is about 2% of the length of the channel. At the outlet from the reaction chamber, the hot cracked gas is quenched with 500 metric tons of naphthalene per hour having a temperature of 180° C. There is no preignition in the mixer. If the perforated plates be omitted, stable operation of the burner is impossible because of frequent preignition.

The diameter of one channel is 25 mm. and its cross-section 491 sq. mm.; each perforated plate has nineteen holes each having a diameter of 4.2 mm. and a cross-section area of 13.81 sq. mm.;

$$\frac{13.81 \times 19}{491} = \text{about } 53\%$$

The holes are arranged symmetrically. The thickness of the perforated plate is 3 mm. and the length of a channel is 160 mm.

We claim:
1. In an apparatus for the production of gas containing acetylene by partial oxidation of hydrocarbons with oxygen comprising means for separately preheating the hydrocarbon and oxygen, means for mixing these reactants and conducting them through a diffusor chamber and a gas distributor containing parallel channels into a reaction chamber, the improvement of at least one perforated plate mounted on the diffusor side of the gas distributor to provide a plurality of holes in fluid communication with and adapted to constrict the free cross-sectional area of each of said channels on the diffusor side.

2. Apparatus as claimed in claim 1 wherein the sum of the free cross-sectional areas of the holes in the perforated plates is 30 to 90% of the free cross-sectional area of the channels.

3. Apparatus as claimed in claim 2 wherein the said percentage is 40 to 60%.

4. Apparatus as claimed in claim 1 wherein the thickness of the perforated plate is 0.5 to 10% of the length of the channels.

5. Apparatus as claimed in claim 4 wherein the said percentage is 1 to 5%.

References Cited

UNITED STATES PATENTS 3,081,818   3/1963   Braconier et al. __ 431—346 XR

FOREIGN PATENTS 1,302,349   7/1962   France.

JAMES H. TAYMAN, JR., Primary Examiner

U.S. Cl. X.R.

23—284; 48—192; 260—679; 431—346